(12) United States Patent
Sridhara et al.

(10) Patent No.: US 8,892,127 B2
(45) Date of Patent: Nov. 18, 2014

(54) WIRELESS-BASED POSITIONING ADJUSTMENTS USING A MOTION SENSOR

(75) Inventors: Vinay Sridhara, Santa Clara, CA (US); Alok Aggarwal, Foster City, CA (US); Ayman Fawzy Naguib, Cupertino, CA (US)

(73) Assignee: QUALCOMM Incorporated, San Diego, CA (US)

(*) Notice: Subject to any disclaimer, the term of this patent is extended or adjusted under 35 U.S.C. 154(b) by 749 days.

(21) Appl. No.: 12/622,307

(22) Filed: Nov. 19, 2009

(65) Prior Publication Data
US 2010/0130229 A1 May 27, 2010

Related U.S. Application Data

(60) Provisional application No. 61/116,969, filed on Nov. 21, 2008.

(51) Int. Cl.
*H04W 24/00* (2009.01)
*G01S 19/49* (2010.01)

(52) U.S. Cl.
CPC ..................................... *G01S 19/49* (2013.01)
USPC .................. 455/456.2; 455/456.1; 455/404.2; 455/440; 455/441

(58) Field of Classification Search
CPC ... H04W 64/00; H04W 4/02; H04L 29/08657
USPC ................. 455/456.2, 456.1, 404.2, 440, 441
See application file for complete search history.

(56) References Cited

U.S. PATENT DOCUMENTS

| | | | |
|---|---|---|---|
| 6,477,380 | B1 | 11/2002 | Uehara et al. |
| 6,665,333 | B2 | 12/2003 | McCrady et al. |
| 6,681,099 | B1 | 1/2004 | Keranen et al. |
| 6,754,488 | B1 | 6/2004 | Won et al. |
| 7,079,851 | B2 | 7/2006 | Makuta |
| 7,130,646 | B2 | 10/2006 | Wang |

(Continued)

FOREIGN PATENT DOCUMENTS

| | | |
|---|---|---|
| CN | 1269947 A | 10/2000 |
| CN | 1444833 A | 9/2003 |

(Continued)

OTHER PUBLICATIONS

Awad, A., et al., "Adaptive Distance Estimation and Localization in WSN Using RSSI Measures" 10th Euromicro Conference on Gidital System Design Architectures, Methods, and Tools (DSD 2007) Los Alamitos, CA IEEE Computer Soc., Piscataway, NJ, US Aug. 29, 2007 pp. 471-478.

(Continued)

*Primary Examiner* — Nghi H Ly
(74) *Attorney, Agent, or Firm* — Jennifer M. Pascua

(57) ABSTRACT

Apparatuses and methods for adjusting wireless-derived positions of a mobile station using a motion sensor are presented. One method includes estimating a position of a mobile station based upon wireless signal measurements and measuring a movement of the mobile station using a relative motion sensor. The method further includes detecting a displacement of the mobile station based upon the measured movement, determining that the displacement is below a threshold and then adjusting the estimated position of the mobile station using information from the relative motion sensor. An apparatus includes a wireless transceiver, a relative motion sensor, a processor coupled to the wireless transceiver and the relative motion sensor, and a memory coupled to the processor. The memory stores executable instructions and data for causing the processor to execute methods for adjusting wireless-derived positions using a motion sensor.

44 Claims, 5 Drawing Sheets

(56) References Cited

U.S. PATENT DOCUMENTS

| | | |
|---|---|---|
| 7,138,946 B2 | 11/2006 | Tamaki et al. |
| 7,233,800 B2 | 6/2007 | Laroia et al. |
| 7,319,878 B2 | 1/2008 | Sheynblat et al. |
| 7,346,120 B2 | 3/2008 | McCorkle |
| 7,373,156 B2 | 5/2008 | Ruutu et al. |
| 7,383,049 B2 | 6/2008 | Deloach, Jr. et al. |
| 7,469,139 B2 | 12/2008 | Van de Groenendaal |
| 7,525,484 B2 | 4/2009 | Dupray et al. |
| 7,574,216 B2 | 8/2009 | Leitch et al. |
| 7,672,283 B1 | 3/2010 | Chang et al. |
| 7,676,218 B2 | 3/2010 | Ballai |
| 7,716,740 B2 | 5/2010 | Robert et al. |
| 7,751,829 B2 | 7/2010 | Masuoka et al. |
| 7,756,615 B2 * | 7/2010 | Barfoot et al. .................. 701/25 |
| 7,810,154 B2 | 10/2010 | Hum et al. |
| 7,893,873 B2 | 2/2011 | Black et al. |
| 7,899,006 B2 | 3/2011 | Boyd |
| 7,941,159 B2 | 5/2011 | Walley et al. |
| 7,983,622 B1 | 7/2011 | Vaughan |
| 8,032,153 B2 | 10/2011 | Dupray et al. |
| 8,045,996 B2 | 10/2011 | Brunner et al. |
| 8,165,150 B2 | 4/2012 | Aweya et al. |
| 8,238,942 B2 | 8/2012 | Gast |
| 8,244,272 B2 | 8/2012 | Morgan et al. |
| 2001/0053699 A1 | 12/2001 | McCrady et al. |
| 2002/0118723 A1 | 8/2002 | McCrady et al. |
| 2002/0173295 A1 | 11/2002 | Nykanen et al. |
| 2003/0125046 A1 | 7/2003 | Riley et al. |
| 2003/0129995 A1 | 7/2003 | Niwa et al. |
| 2003/0182053 A1 | 9/2003 | Swope et al. |
| 2004/0003285 A1 | 1/2004 | Whelan et al. |
| 2004/0023640 A1 | 2/2004 | Ballai |
| 2004/0104842 A1 | 6/2004 | Drury et al. |
| 2004/0189712 A1 | 9/2004 | Rundell |
| 2004/0203539 A1 | 10/2004 | Benes et al. |
| 2004/0203931 A1 | 10/2004 | Karaoguz |
| 2004/0223599 A1 | 11/2004 | Bear et al. |
| 2004/0235499 A1 | 11/2004 | Tanaka et al. |
| 2004/0258012 A1 | 12/2004 | Ishii |
| 2005/0055412 A1 | 3/2005 | Kaminsky et al. |
| 2005/0058081 A1 | 3/2005 | Elliott |
| 2005/0130669 A1 | 6/2005 | Mizugaki et al. |
| 2005/0130699 A1 | 6/2005 | Kim |
| 2005/0201533 A1 | 9/2005 | Emam et al. |
| 2005/0208900 A1 | 9/2005 | Karacaoglu |
| 2006/0004911 A1 | 1/2006 | Becker et al. |
| 2006/0009235 A1 | 1/2006 | Sheynblat et al. |
| 2006/0085581 A1 | 4/2006 | Martin |
| 2006/0090169 A1 | 4/2006 | Daniels et al. |
| 2006/0120334 A1 | 6/2006 | Wang et al. |
| 2006/0189329 A1 | 8/2006 | Anderson |
| 2006/0195252 A1 | 8/2006 | Orr et al. |
| 2006/0200862 A1 | 9/2006 | Olson et al. |
| 2006/0256838 A1 | 11/2006 | Yarkosky |
| 2007/0002813 A1 | 1/2007 | Tenny et al. |
| 2007/0078905 A1 | 4/2007 | Gunther et al. |
| 2007/0099646 A1 | 5/2007 | Tanaka et al. |
| 2007/0115842 A1 | 5/2007 | Matsuda et al. |
| 2007/0121560 A1 | 5/2007 | Edge |
| 2007/0136686 A1 | 6/2007 | Price et al. |
| 2007/0265020 A1 | 11/2007 | Cuffaro |
| 2008/0002820 A1 | 1/2008 | Shtiegman et al. |
| 2008/0034435 A1 | 2/2008 | Grabarnik et al. |
| 2008/0068257 A1 | 3/2008 | Mizuochi |
| 2008/0069318 A1 | 3/2008 | McClung |
| 2008/0097966 A1 | 4/2008 | Choi et al. |
| 2008/0101227 A1 | 5/2008 | Fujita et al. |
| 2008/0101277 A1 | 5/2008 | Taylor et al. |
| 2008/0180315 A1 * | 7/2008 | Tarlow et al. ............ 342/357.01 |
| 2008/0198811 A1 | 8/2008 | Deshpande et al. |
| 2008/0232297 A1 | 9/2008 | Mizugaki et al. |
| 2008/0250498 A1 | 10/2008 | Butti et al. |
| 2008/0287056 A1 | 11/2008 | Van de Groenendaal |
| 2008/0287139 A1 | 11/2008 | Carlson et al. |
| 2008/0299993 A1 | 12/2008 | Gordon et al. |
| 2008/0301262 A1 | 12/2008 | Kinoshita et al. |
| 2009/0011713 A1 | 1/2009 | Abusubaih et al. |
| 2009/0059797 A1 | 3/2009 | Northcutt et al. |
| 2009/0135797 A1 | 5/2009 | Zhang et al. |
| 2009/0257426 A1 | 10/2009 | Hart et al. |
| 2009/0286549 A1 | 11/2009 | Canon et al. |
| 2010/0020776 A1 | 1/2010 | Youssef et al. |
| 2010/0067393 A1 | 3/2010 | Sakimura et al. |
| 2010/0081451 A1 | 4/2010 | Mueck et al. |
| 2010/0128617 A1 | 5/2010 | Aggarwal et al. |
| 2010/0128637 A1 | 5/2010 | Aggarwal et al. |
| 2010/0130230 A1 | 5/2010 | Aggarwal et al. |
| 2010/0135178 A1 | 6/2010 | Aggarwal et al. |
| 2010/0141515 A1 * | 6/2010 | Doucet et al. ............ 342/357.07 |
| 2010/0157848 A1 | 6/2010 | Das et al. |
| 2010/0159958 A1 | 6/2010 | Naguib et al. |
| 2010/0172259 A1 | 7/2010 | Aggarwal et al. |
| 2011/0092226 A1 | 4/2011 | Maher et al. |
| 2011/0173674 A1 | 7/2011 | Thomson et al. |
| 2011/0217987 A1 | 9/2011 | Van De Groenendaal |
| 2011/0269478 A1 | 11/2011 | Das et al. |
| 2013/0072227 A1 | 3/2013 | Morgan et al. |
| 2013/0072228 A1 | 3/2013 | Naguib et al. |
| 2013/0143497 A1 | 6/2013 | Das et al. |
| 2013/0223261 A1 | 8/2013 | Aggarwal et al. |
| 2013/0237246 A1 | 9/2013 | Aggarwal et al. |
| 2014/0018065 A1 | 1/2014 | Naguib et al. |

FOREIGN PATENT DOCUMENTS

| | | |
|---|---|---|
| CN | 1509561 A | 6/2004 |
| CN | 1606840 A | 4/2005 |
| CN | 1783810 A | 6/2006 |
| CN | 1914939 A | 2/2007 |
| CN | 101000369 A | 7/2007 |
| CN | 101023632 A | 8/2007 |
| CN | 101082665 A | 12/2007 |
| CN | 101248626 A | 8/2008 |
| EP | 1050977 A2 | 11/2000 |
| EP | 1180696 A2 | 2/2002 |
| EP | 1253404 A2 | 10/2002 |
| EP | 1253437 A2 | 10/2002 |
| EP | 1398913 A2 | 3/2004 |
| EP | 1641183 | 3/2006 |
| EP | 1691170 | 8/2006 |
| EP | 1808708 | 7/2007 |
| EP | 1862811 A2 | 12/2007 |
| EP | 1879370 A1 | 1/2008 |
| EP | 1992964 A2 | 11/2008 |
| EP | 2073562 A1 | 6/2009 |
| JP | 50052993 A | 5/1975 |
| JP | 59046568 A | 3/1984 |
| JP | 8146110 A | 6/1996 |
| JP | 8211141 A | 8/1996 |
| JP | 11313359 A | 11/1999 |
| JP | 11326484 A | 11/1999 |
| JP | 2001007764 A | 1/2001 |
| JP | 2001147262 A | 5/2001 |
| JP | 2001268622 A | 9/2001 |
| JP | 2002040121 A | 2/2002 |
| JP | 2002098747 A | 4/2002 |
| JP | 2002159041 A | 5/2002 |
| JP | 2003510614 A | 3/2003 |
| JP | 2003174665 A | 6/2003 |
| JP | 2003204572 A | 7/2003 |
| JP | 2003279648 A | 10/2003 |
| JP | 2004258009 A | 9/2004 |
| JP | 2004350088 A | 12/2004 |
| JP | 2005140617 A | 6/2005 |
| JP | 2005520139 A | 7/2005 |
| JP | 2005345200 A | 12/2005 |
| JP | 2006013894 A | 1/2006 |
| JP | 2006507500 A | 3/2006 |
| JP | 2006148457 A | 6/2006 |
| JP | 2006170891 A | 6/2006 |
| JP | 2006311475 A | 11/2006 |
| JP | 2007500491 A | 1/2007 |
| JP | 2007089006 A | 4/2007 |
| JP | 2007127584 A | 5/2007 |

(56) References Cited

FOREIGN PATENT DOCUMENTS

| | | | |
|---|---|---|---|
| JP | 2007512784 A | 5/2007 |
| JP | 2007212420 A | 8/2007 |
| JP | 2007526445 A | 9/2007 |
| JP | 2007529943 A | 10/2007 |
| JP | 2008026138 A | 2/2008 |
| JP | 2008029003 A | 2/2008 |
| JP | 2008039738 A | 2/2008 |
| JP | 2008503758 A | 2/2008 |
| JP | 2008104029 A | 5/2008 |
| JP | 2008122132 A | 5/2008 |
| JP | 2008128728 A | 6/2008 |
| JP | 2008522181 A | 6/2008 |
| JP | 2008527769 A | 7/2008 |
| JP | 2008533436 A | 8/2008 |
| JP | 2008224657 A | 9/2008 |
| JP | 2008233066 A | 10/2008 |
| JP | 2008236516 A | 10/2008 |
| JP | 2009074974 A | 4/2009 |
| JP | 2009150872 A | 7/2009 |
| JP | 2009253494 A | 10/2009 |
| JP | 2010019597 A | 1/2010 |
| KR | 20040068352 A | 7/2004 |
| TW | 1240085 B | 9/2005 |
| TW | 1250303 B | 3/2006 |
| TW | 200618539 | 6/2006 |
| TW | 200718972 | 5/2007 |
| TW | 1292829 B | 1/2008 |
| TW | 200816840 A | 4/2008 |
| TW | 1300852 B | 9/2008 |
| WO | WO9913662 | 3/1999 |
| WO | 0120260 A1 | 3/2001 |
| WO | 0123904 A2 | 4/2001 |
| WO | WO03038466 | 5/2003 |
| WO | 2007021292 A2 | 2/2007 |
| WO | WO2007056738 | 5/2007 |
| WO | 2007121488 A1 | 10/2007 |
| WO | WO-2008012188 A1 | 1/2008 |
| WO | 2008057737 A2 | 5/2008 |
| WO | WO-2008051124 A1 | 5/2008 |
| WO | WO2008066927 | 6/2008 |
| WO | WO-2008085440 A2 | 7/2008 |
| WO | 2008121878 A1 | 10/2008 |
| WO | 2008140880 A1 | 11/2008 |
| WO | WO2010059934 | 5/2010 |

OTHER PUBLICATIONS

Golden Stuart A. et al., "Sensor Measurements for WI-FI Location with Emphasis on Time-of-Arrival Ranging," IEEE Transactions on Mobile Computing, vol. 6 (10), 2007.

Israel Martin-Escalona et al: "Impact of geometry on the accuracy of the passive-TDOA algorithm" Personal, Indoor and Mobile Radio Communications, 2008. PIMRC 2008. IEEE 19th International Symposium on, IEEE, Piscataway, NO, USA, Sep. 15, 2008, pp. 1-6, XP031371602 ISBN: 978-1-4244-2643-0 abstract I I. Passive-TDOA Positioning Algorithm.

Jan Blumenthal et al: "Precise Positioning with a Low Complexity Algorithm in Ad hoc Wireless Sensor Networks" PIK. Praxis Der Informationsverarbeitung und Kommunikation, Saur, Muenchen, De LNKD-001:10.1515/PIKO.2005.80, [Online] vol. 28, No. 21, Jun. 1, 2005, pp. 80-85, XP002495976 ISSN: 0930-5157 Retrieved from the Internet: URL:http:// rtl.e-technik-uni-rostock.de/%20frei/geosens/dateien/BRT05.pdf [retrieved on Jun. 1, 2005].

MacCrady D et al: "Mobile Ranging With Low Accuracy Clocks" Radio and Wireless Conference, 1999. RAWCON 99. 1999 IEEE Denver, CO, USA Aug. 1-4, 1999, Piscataway, NJ, USA,IEEE, US LNKD-DOI:10.1109/RAWCON.1999.810937, Aug. 1, 1999, pp. 85-88, XP010365195 ISBN: 978-0-7803-5454-8.

Mao et al: "Wireless sensor network localization techniques" Computer Networks, Elsevier Science Publishers B.V;, Amsterdam, NL LNKD-DOI: 10.1016/ J.COMNET. 2006.11.018, vol. 51, No. 10, May 6, 2007, pp. 2529-2553, XP022063022 ISSN: 1389-1286.

Murad Abusubaih et al: "A dual distance measurement scheme for indoor IEEE 802.11 wireless local area networks" Mobile Wireless Communications Networks, 2007 9th IFIP International Conference on, IEEE, Piscataway, NJ, USA, Sep. 19, 2007, pp. 121-125, XP031359266 ISBN: 978-1-4244-1719-3.

Xinrong Li et al: "Comparison of indoor geolocation methods in DSSS and OFDM wireless LAN systems" Vehicular Technology Conference, 2000, IEEE VTS Fall VTC 2000, 52nd Sep. 24-28, 2000, Piscataway, NJ, USA,IEEE, vol. 6, Sep. 24, 2000, pp. 3015-3020, XP010525129 ISBN: 978-0-7803-6507-0 abstract p. 3017, right-hand column.

International Search Report—PCT/US2009/065322—International Search Authority, European Patent Office, Jul. 4, 2010.

Andre Gunther, et al., "Measuring Round Trip Times to Determine the Distance between WLAN Nodes", Proceedings of Networking 2005, May 6, 2005, pp. 1-12, XP002655207, Waterloo, Canada pp. 1-6.

Gerasenko S., et al., "Beacon Signals: What, Why, How, and Where", IEEE Computer Society, Computer, vol. 34, No. 10, pp. 108-110, Oct. 2001, doi:10.1109/2.955103.

Lim Y., et al., "Wireless Intrusion Detection and Response", IEEE, 8 Pages, 2003.

Watkins L., et al., "A Passive Approach to Rogue Access Point Detections", IEEE, 6 Pages, 2007.

Written Opinion—PCT/US2009/065322—ISA/EPO—Jul. 4, 2010.

Manolakis D.E., "Efficient Solution and Performance analysis of 3-D Position Estimatin by Trilateration", IEEE Transactions on Aerospace and Electronic Systems, vol. 32, No. 4, Oct 1996.

European Search Report—EP12008413—Search Authority—The Hague—May 8, 2013.

Taiwan Search Report—TW098139784—TIPO—Feb. 9, 2013.

* cited by examiner

WIRELESS-BASED POSITIONING ADJUSTMENTS USING A MOTION SENSOR

CLAIM OF PRIORITY UNDER 35 U.S.C. §119

The present Application for Patent claims priority to Provisional Application No. 61/116,969 entitled "Accelerometer-based Calibration of Processing Delay for Positioning" filed Nov. 21, 2008, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:

"BEACON SECTORING FOR POSITION DETERMINATION" by Aggarwal et al., having Ser. No. 12/622, 369, filed concurrently herewith, assigned to the assignee hereof, and expressly incorporated by reference herein.

"WIRELESS POSITION DETERMINATION USING ADJUSTED ROUND TRIP TIME MEASUREMENTS" by Aggarwal et al., having Ser. No. 12/622, 289, filed concurrently herewith, assigned to the assignee hereof, and expressly incorporated by reference herein.

"NETWORK CENTRIC DETERMINATION OF NODE PROCESSING DELAY" by Aggarwal et al., having Ser. No. 12/622,356, filed concurrently herewith, assigned to the assignee hereof, and expressly incorporated by reference herein.

FIELD OF DISCLOSURE

Aspects of this disclosure generally relate to wireless communication systems, and more specifically, to improved position determination methods and apparatuses for mobile devices using relative motion sensors.

BACKGROUND

Mobile communications networks are in the process of offering increasingly sophisticated capabilities associated with the motion and/or position location sensing of a mobile device. New software applications, such as, for example, those related to personal productivity, collaborative communications, social networking, and/or data acquisition, may utilize motion and/or position sensors to provide new features and services to consumers. Moreover, some regulatory requirements of various jurisdictions may require a network operator to report the location of a mobile device when the mobile device places a call to an emergency service, such as a 911 call in the United States.

Such motion and/or position determination capability has conventionally been provided using both digital cellular positioning techniques and/or Satellite Positioning Systems (SPS). Additionally, with the increasing proliferation of miniaturized motion sensors (e.g., simple switches, accelerometers, angle sensors, etc), such on-board devices may be used to provide relative position, velocity, acceleration and/or orientation information.

In conventional digital cellular networks, position location capability can be provided by various time and/or phase measurement techniques. For example, in CDMA networks, one position determination approach used is Advanced Forward Link Trilateration (AFLT). Using AFLT, a mobile device may compute its position from phase measurements of pilot signals transmitted from a plurality of base stations.

Improvements to AFLT have been realized by utilizing hybrid position location techniques, where the mobile station may employ a Satellite Positioning System (SPS) receiver. The SPS receiver may provides position information independent of the information derived from the signals transmitted by the base stations. Moreover, position accuracy can be improved by combining measurements derived from both SPS and AFLT systems using conventional techniques.

However, conventional position location techniques based upon signals provided by SPS and/or cellular base stations may encounter difficulties when the mobile device is operating within a building and/or within urban environments. In such situations, signal reflection and refraction, multipath, and/or signal attenuation can significantly reduce position accuracy, and can slow the "time-to-fix" to unacceptably long time periods. These shortcomings may be overcome by having the mobile device exploit signals from other existing wireless networks, such as, for example, Wi-Fi (e.g., 801.11x standards), to derive position information. Conventional position determination techniques used in other existing wireless networks may utilize round trip time (RTT) measurements derived from signals utilized within these networks.

Utilizing RTT measurement techniques to accurately determine position typically involves knowledge of time delays incurred by the wireless signals as they propagate through various devices comprising the network. Such delays may be spatially variant due to, for example, multipath and/or signal interference. Moreover, such processing delays may change over time based upon the type of network device and/or the network device's current networking load. In practice, when employing conventional RTT positioning techniques, estimating processing delay times may involve hardware changes in the wireless access points, and/or time-consuming pre-deployment fingerprinting and/or calibration of the operational environment.

Accordingly, when using RTT techniques for position determination, it may be desirable to exploit on-board relative motion sensors to assist in the estimation of processing delays. Such techniques may improve the position location accuracy and performance a mobile device in a cost-efficient manner.

SUMMARY

Exemplary embodiments of the invention are directed to systems and method for adjusting the wireless-based position of a mobile station using a relative motion sensor. One embodiment may include estimating a position of a mobile station based upon wireless signal measurements and measuring a movement of the mobile station using a relative motion sensor. The embodiment may further include detecting a displacement of the mobile station based upon the measured movement, determining that the displacement is below a threshold, and then adjusting the estimated position of the mobile station using information from the relative motion sensor.

In another embodiment, an apparatus for adjusting the wireless-based position of a mobile station using a relative motion sensor is presented. The embodiment may include a wireless transceiver, a relative motion sensor, a processor coupled to the wireless transceiver and the relative motion sensor, and a memory coupled to the processor. The memory stores executable instructions and data for causing the processor to estimate a position of the mobile station based upon wireless signal measurements received by the wireless transceiver, determine that the mobile station is moving based upon information provided by the relative motion sensor, calculate a displacement of the mobile station based upon the information provided by the relative motion sensor, determining that the displacement is below a threshold, and adjust the estimated position of the mobile station using information from the relative motion sensor.

In yet another embodiment, a method for adjusting the wireless-based position of a mobile station is presented. The embodiment includes estimating a position of a mobile station based upon wireless signal measurements, detecting a displacement of the mobile station using a relative motion sensor, adjusting an estimated processing delay of a wireless access point using the detected displacement, and refining the estimated position of the mobile station using the adjusted processing delay.

Various embodiments presented herein may have the advantages improving the position location accuracy and performance of a mobile station in an efficient manner, and may avoid costly conventional techniques that may be difficult to implement in practice (e.g., implementing calibration look-up tables).

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the embodiments are disclosed in the following description and related drawings. Alternate embodiments may be devised without departing from the scope of the claims. Additionally, well-known elements of the embodiments will not be described in detail or will be omitted so as not to obscure relevant details.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
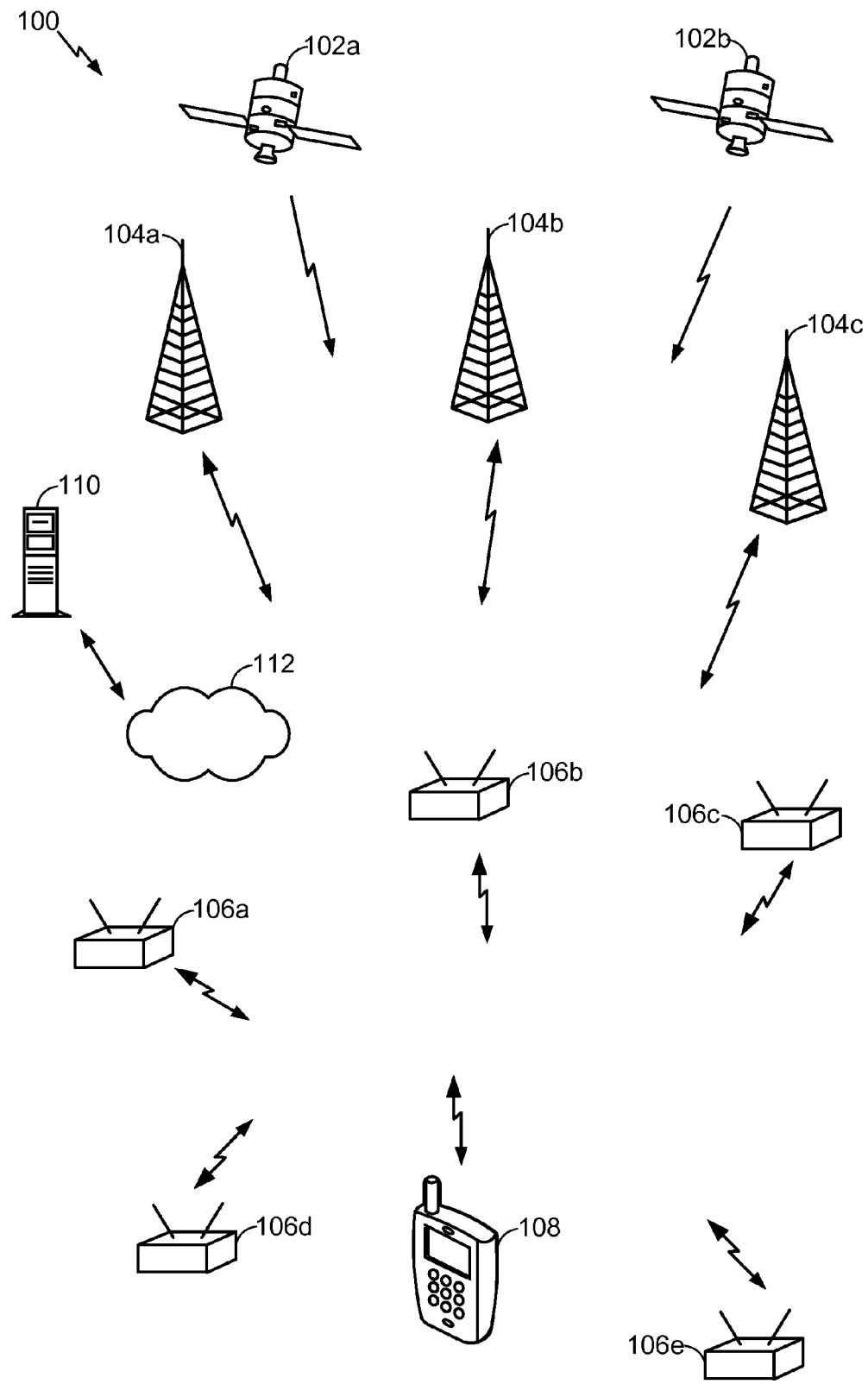
FIG. 1 is a diagram of an exemplary operating environment for a mobile station that can determine position using wireless techniques.

FIG. 1 is a diagram of an exemplary operating environment 100 for a mobile station 108 having wireless positioning capability. Embodiments are directed to a mobile station 108 which may determine its position based upon round trip time measurements (RTTs) that are adjusted to accommodate for processing delays introduced by wireless access points. The processing delays may vary among different access points and may also change over time. By using information from a relative motion sensor, the mobile station may calibrate out the effects of the processing delays introduced by the wireless access points.

The operating environment 100 may contain one or more different types of wireless communication systems and/or wireless positioning systems. In the embodiment shown in FIG. 1, a Satellite Positioning System (SPS) 102 may be used as an independent source of position information for the mobile station 108. The mobile station 108 may include one or more dedicated SPS receivers specifically designed to receive signals for deriving geo-location information from the SPS satellites.

The operating environment 100 may also include a plurality of one or more types of Wide Area Network Wireless Access Points (WAN-WAPs) 104, which may be used for wireless voice and/or data communication, and as another source of independent position information for the mobile station 108. The WAN-WAPs 104 may be part of a wide area wireless network (WWAN), which may include cellular base stations at known locations, and/or other wide area wireless systems, such as, for example, WiMAX (e.g., 802.16). The WWAN may include other known network components which are not shown in FIG. 1 for simplicity. Typically, each of the WAN-WAPs 104a-104c within the WWAN may operate from fixed positions, and provide network coverage over large metropolitan and/or regional areas.

The operating environment 100 may further include Local Area Network Wireless Access Points (LAN-WAPs) 106, may be used for wireless voice and/or data communication, as well as another independent source of position data. The LAN-WAPs can be part of a Wireless Local Area Network (WLAN), which may operate in buildings and perform communications over smaller geographic regions than a WWAN.

Such LAN-WAPs 106 may be part of, for example, WiFi networks (802.11x), cellular piconets and/or femtocells, Bluetooth Networks, etc.

The mobile station 108 may derive position information from any one or a combination of the SPS satellites 102, the WAN-WAPs 104, and/or the LAN-WAPs 106. Each of the aforementioned systems can provide an independent estimate of the position for the mobile station 108 using different techniques. In some embodiments, the mobile station may combine the solutions derived from each of the different types of access points to improve the accuracy of the position data. When deriving position using the SPS 102, the mobile station may utilize a receiver specifically designed for use with the SPS that extracts position, using conventional techniques, from a plurality of signals transmitted by SPS satellites 102.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground-based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals," as used herein, is intended to include SPS-like signals from pseudolites or equivalents of pseudolites.

When deriving position from the WWAN, each WAN-WAPs 104a-104c may take the form of base stations within a digital cellular network, and the mobile station 108 may include a cellular transceiver and processor that can exploit the base station signals to derive position. Such cellular networks may include, but are not limited to, standards in accordance with GSM, CMDA, 2G, 3G, 4G, LTE, etc. It should be understood that digital cellular network may include additional base stations or other resources show in FIG. 1. While WAN-WAPs 104 may actually be moveable or otherwise capable of being relocated, for illustration purposes it will be assumed that they are essentially arranged in a fixed position.

The mobile station 108 may perform position determination using known time-of-arrival techniques such as, for example, Advanced Forward Link Trilateration (AFLT). In other embodiments, each WAN-WAP 104a-104c may take the form of a WiMax wireless networking base station. In this case, the mobile station 108 may determine its position using time-of-arrival (TOA) techniques from signals provided by the WAN-WAPs 104. The mobile station 108 may determine positions either in a stand-alone mode, or using the assistance of a positioning server 110 and network 112 using TOA techniques, as will be described in more detail below. Note that embodiments of the disclosure include having the mobile station 108 determine position information using WAN-WAPs 104 which are different types. For example, some WAN-WAPs 104 may be cellular base stations, and other WAN-WAPs may be WiMax base stations. In such an operating environment, the mobile station 108 may be able to exploit the signals from each different type of WAN-WAP, and further combine the derived position solutions to improve accuracy.

When deriving position using the WLAN, the mobile station 108 may utilize time of arrival techniques with the assistance of the positioning server 110 and the network 112. The positioning server 110 may communicate to the mobile station through network 112. Network 112 may include a combination of wired and wireless networks which incorporate the LAN-WAPs 106. In one embodiment, each LAN-WAP 106a-106e may be, for example, a WiFi wireless access point, which is not necessarily set in a fixed position and can change location. The position of each LAN-WAP 106a-106e may be stored in the positioning server 110 in a common coordinate system. In one embodiment, the position of the mobile station 108 may be determined by having the mobile station 108 receive signals from each LAN-WAP 106a-106e. Each signal may be associated with its originating LAN-WAP based upon some form of identifying information that may be included in the received signal (such as, for example, a MAC address). The mobile station 108 may then sort the received signals based upon signal strength, and derive the time delays associated with each of the sorted received signals. The mobile station 108 may then form a message which can include the time delays and the identifying information of each of the LAN-WAPs, and send the message via network 112 to the positioning sever 110. Based upon the received message, the positioning server may then determine a position, using the stored locations of the relevant LAN-WAPs 106, of the mobile station 108. The positioning server 110 may generate and provide a Location Configuration Indication (LCI) message to the mobile station 108 that includes a pointer to the mobile station's position in a local coordinate system. The LCI message may also include other points of interest in relation to the location of the mobile station 108. When computing the position of the mobile station 108, the positioning server may take into account the different delays which can be introduced by elements within the wireless network.

The position determination techniques described herein may be used for various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

Figure 2:
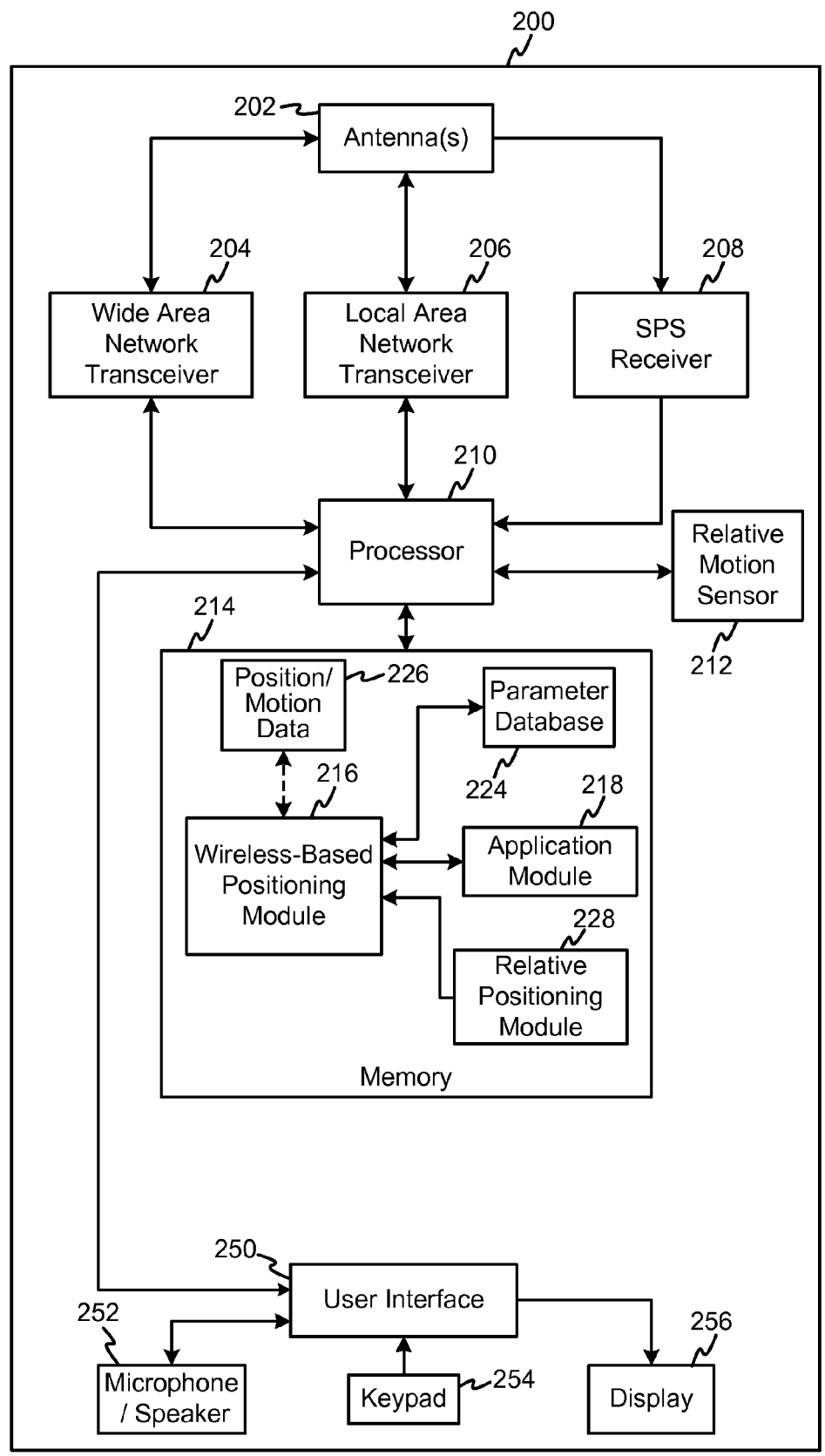
FIG. 2 is a block diagram illustrating various components of an exemplary mobile station.

FIG. 2 is a block diagram illustrating various components of an exemplary mobile station 200. For the sake of simplicity, the various features and functions illustrated in the box diagram of FIG. 2 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

The mobile station 200 may include one or more wide area network transceiver(s) 204 that may be connected to one or more antennas 202. The wide area network transceiver 204 comprises suitable devices, hardware, and/or software for communicating with and/or detecting signals to/from WAN-WAPs 104, and/or directly with other wireless devices within a network. In one aspect, the wide area network transceiver 204 may comprise a CDMA communication system suitable for communicating with a CDMA network of wireless base stations; however in other aspects, the wireless communication system may comprise another type of cellular telephony network, such as, for example, TDMA or GSM. Additionally, any other type of wide area wireless networking technologies may be used, for example, WiMax (802.16), etc. The mobile station 200 may also include one or more local area network transceivers 206 that may be connected to one or more antennas 202. The local area network transceiver 204 comprises suitable devices, hardware, and/or software for communicating with and/or detecting signals to/from LAN-WAPs 106, and/or directly with other wireless devices within a network. In one aspect, the local area network transceiver 204 may comprise a WiFi (802.11x) communication system suitable for communicating with one or more wireless access points; however in other aspects, the local area network transceiver 206 comprise another type of local area network, personal area network, (e.g., Bluetooth). Additionally, any other type of wireless networking technologies may be used, for example, Ultra Wide Band, ZigBee, wireless USB etc.

As used herein, the abbreviated term "wireless access point" (WAP) may be used to refer to LAN-WAPs 106 and/or WAN-WAPs 104. Specifically, in the description presented below, when the term "WAP" is used, it should be understood that embodiments may include a mobile station 200 that can exploit signals from a plurality of LAN-WAPs 106, a plurality of WAN-WAPs 104, or any combination of the two. The specific type of WAP being utilized by the mobile station 200 may depend upon the environment of operation. Moreover, the mobile station 200 may dynamically select between the various types of WAPs in order to arrive at an accurate position solution. In other embodiments, various network elements may operate in a peer-to-peer manner, whereby, for example, the mobile station may be replaced with the WAP, or vice versa. Other peer-to-peer embodiments may include another mobile station (not shown) acting in place of one or more WAP.

An SPS receiver 208 may also be included in the mobile station 200. The SPS receiver 208 may be connected to the one or more antennas 202 for receiving satellite signals. The SPS receiver 208 may comprise any suitable hardware and/or software for receiving and processing SPS signals. The SPS receiver 208 requests information and operations as appropriate from the other systems, and performs the calculations necessary to determine the mobile station's 200 position using measurements obtained by any suitable SPS algorithm.

A relative motion sensor 212 may be coupled to a processor 210 to provide relative movement and/or orientation information which is independent of motion data derived from signals received by the wide area network transceiver 204, the local area network transceiver 206 and the SPS receiver 208.

By way of example but not limitation, the relative motion sensor 212 may utilize an accelerometer (e.g., a MEMS device), a gyroscope, a geomagnetic sensor (e.g., a compass), an altimeter (e.g., a barometric pressure altimeter), and/or any other type of movement detection sensor. Moreover, the relative motion sensor 212 may include a plurality of different types of devices and combine their outputs in order to provide motion information. For example, the relative motion sensor 212 may use a combination of a multi-axis accelerometer and orientation sensors to provide the ability to compute positions in 2-D and/or 3-D coordinate systems.

The processor 210 may be connected to the wide area network transceiver 204, local area network transceiver 206, the SPS receiver 208 and the relative motion sensor 212. The processor 210 may include one or more microprocessors, microcontrollers, and/or digital signal processors that provide processing functions, as well as other calculation and control functionality. The processor 210 may also include memory 214 for storing data and software instructions for executing programmed functionality within the mobile station. The memory 214 may be on-board the processor 210 (e.g., within the same IC package), and/or the memory may be external memory to the processor and functionally coupled over a data bus. The details of software functionality associated with aspects of the disclosure will be discussed in more detail below.

A number of software modules and data tables may reside in memory 214 and be utilized by the processor 210 in order to manage both communications and positioning determination functionality. As illustrated in FIG. 2, memory 214 may include and/or otherwise receive a wireless-based positioning module 216, an application module 218, and a relative positioning module 228. One should appreciate that the organization of the memory contents as shown in FIG. 2 is merely exemplary, and as such the functionality of the modules and/or data structures may be combined, separated, and/or be structured in different ways depending upon the implementation of the mobile station 200.

The application module 218 may be a process running on the processor 210 of the mobile device 200, which requests position information from the wireless-based positioning module 216. Applications typically run within an upper layer of the software architectures, and may include Indoor Navigation, Buddy Locator, Shopping and Coupons, Asset Tracking, and location Aware Service Discovery. The wireless-based positioning module 216 may derive the position of the mobile device 200 using information derived from time information measured from signals exchanged with a plurality of WAPs. In order to accurately determine position using time-based techniques, reasonable estimates of time delays, introduced by the processing time of each WAP, may be used to calibrate/adjust the time measurements obtained from the signals. As used herein, these time delays are referred to as "processing delays."

Calibration to further refine the processing delays of the WAPs may be performed using information obtained by the relative motion sensor 212. In one embodiment, the relative motion sensor 212 may directly provide position and/or orientation data to the processor 210, which may be stored in memory 214 in the position/motion data module 226. In other embodiments, the relative motion sensor 212 may provided data which should be further processed by processor 210 to derive information to perform the calibration. For example, the relative motion sensor 212 may provide acceleration and/or orientation data (single or multi-axis) which can be processed using relative positioning module 228 to derive position data for adjusting the processing delays in the wireless-based positioning module 216.

After calibration, the position may then be output to the application module 218 in response to its aforementioned request. In addition, the wireless-based positioning module 216 may utilize a parameter database 224 for exchanging operational parameters. Such parameters may include the determined processing delays for each WAP, the WAPs positions in a common coordinate frame, various parameters associated with the network, initial processing delay estimates, etc.

In other embodiments, the additional information may optionally include auxiliary position and/or motion data which may be determined from other sources besides the relative motion sensor 212, such as, for example, from SPS measurements. The auxiliary position data may be intermittent and/or noisy, but may be useful as another source of independent information for estimating the processing delays of the WAPs depending upon the environment in which the mobile station 200 is operating.

For example, in some embodiments, the relative position data supplied by the relative motion sensor 212 (either directly from the position/motion data module 226 or derived by the relative positioning module 228) may be supplemented by data derived from the SPS receiver 208. In other embodiments, the relative position data may be combined with data determined through additional networks using non-RTT techniques (e.g., AFLT within a CDMA network). In certain implementations, all or part of the auxiliary position/motion data 226 may also be provided by way of the relative motion sensor 212 and/or the SPS receiver 214 without further processing by the processor 210. In some embodiments, the auxiliary position/motion data 226 may be directly provided by the relative motion sensor 212 and/or the SPS receiver 208 to the processor 210.

While the modules shown in FIG. 2 are illustrated in the example as being contained in the memory 214, it is recognized that in certain implementations such procedures may be provided for or otherwise operatively arranged using other or additional mechanisms. For example, all or part of the wireless-based positioning module 216 and/or the application module 218 may be provided in firmware. Additionally, while in this example the wireless-based positioning module 216 and the application module 218 are illustrated as being separate features, it is recognized, for example, that such procedures may be combined together as one procedure or perhaps with other procedures, or otherwise further divided into a plurality of sub-procedures.

The processor 210 may include any form of logic suitable for performing at least the techniques provided herein. For example, the processor 210 may be operatively configurable based on instructions in the memory 214 to selectively initiate one or more routines that exploit motion data for use in other portions of the mobile device.

The mobile station 200 may include a user interface 250 which provides any suitable interface systems, such as a microphone/speaker 252, keypad 254, and display 256 that allows user interaction with the mobile station 200. The microphone/speaker 252 provides for voice communication services using the wide area network transceiver 204 and/or the local area network transceiver 206. The keypad 254 comprises any suitable buttons for user input. The display 256 comprises any suitable display, such as, for example, a backlit LCD display, and may further include a touch screen display for additional user input modes.

As used herein, the mobile station 108 may be any portable or movable device or machine that is configurable to acquire wireless signals transmitted from, and transmit wireless signals to, one or more wireless communication devices or networks. As shown in FIGS. 1 and 2, the mobile station 108 is representative of such a portable wireless device. Thus, by way of example but not limitation, the mobile station 108 may include a radio device, a cellular telephone device, a computing device, a personal communication system (PCS) device, or other like movable wireless communication equipped device, appliance, or machine. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above is also considered a "mobile station."

As used herein, the term "wireless device" may refer to any type of wireless communication device which may transfer information over a network and also have position determination and/or navigation functionality. The wireless device may be any cellular mobile terminal, personal communication system (PCS) device, personal navigation device, laptop, personal digital assistant, or any other suitable mobile device capable of receiving and processing network and/or SPS signals.

Wireless-Based Position Determination

As used herein, "wireless-based position determination" means a position determination that is made based on wireless signals. The wireless-based position determination may be accomplished in a variety of ways using separate signal sources or a combination thereof. In some embodiments, wireless position determination may be performed using SPS measurements. For example, if the mobile station 108 has just entered an indoor environment, or if the indoor environment does not severely attenuate SPS signals, satellite positioning may be used. In other embodiments, techniques using signals employed for voice/data communication may be exploited for position determination. Such techniques may include, for example, position determination utilizing a WLAN and/or a WWAN (e.g., WiFi, WiMAX, cellular networks, etc.). Some embodiments may utilize and/or incorporate techniques described in the co-pending application entitled "WIRELESS POSITION DETERMINATION USING ADJUSTED ROUND TRIP TIME MEASUREMENTS" by Aggarwal et al., which is expressly incorporated by reference herein.

Figure 3:
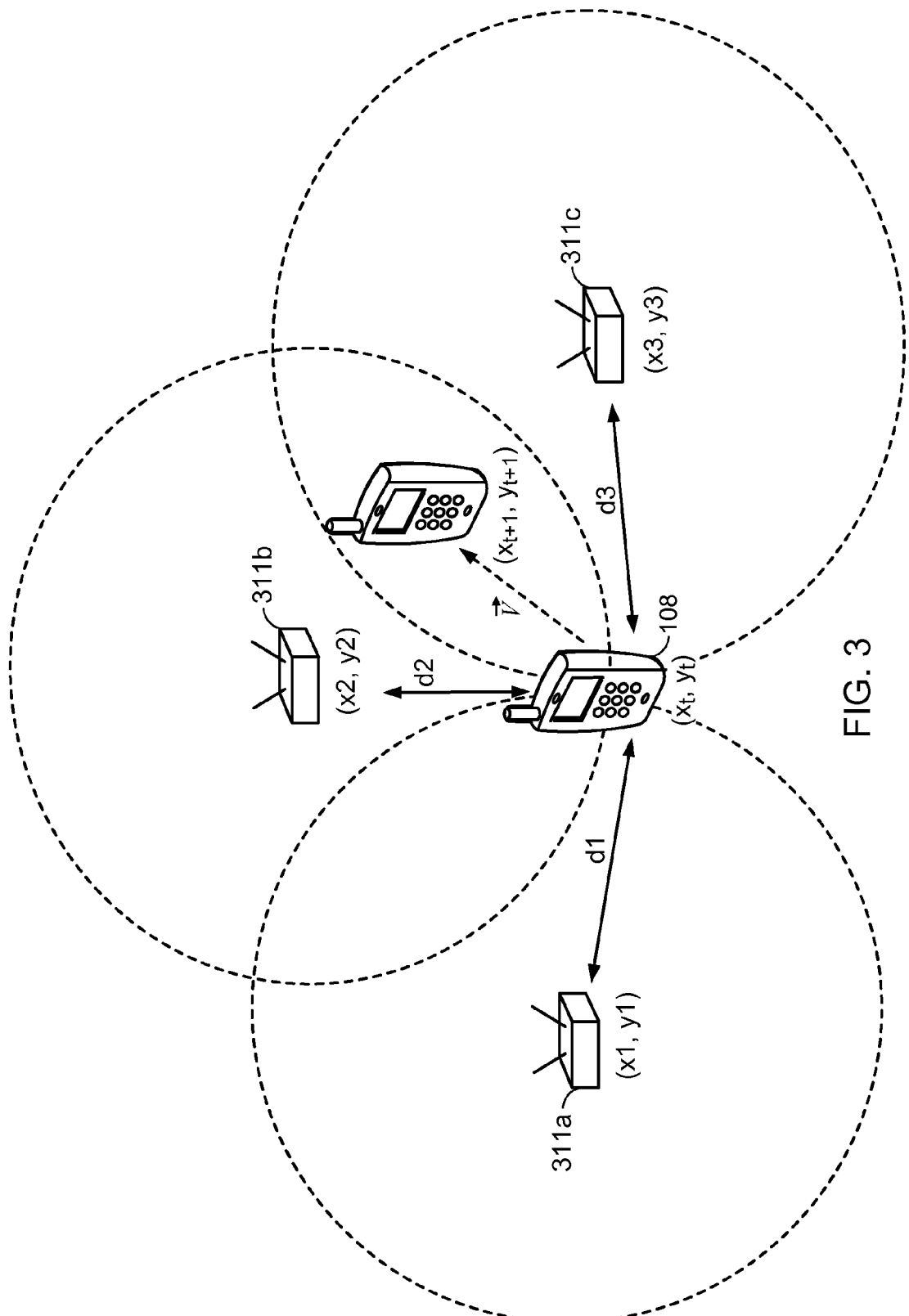
FIG. 3 is diagram illustrating an exemplary technique for determining a position of a mobile station using a relative motion sensor.

A simplified environment is shown in FIG. 3 for illustrating an exemplary technique for determining a position of the mobile station 108. The mobile station 108 may communicate wirelessly with a plurality of WAPs 311 using RF signals (e.g., 2.4 GHz) and standardized protocols for the modulation of the RF signals and the exchanging of information packets (e.g., IEEE 802.11). By extracting different types of information from the exchanged signals, and utilizing the layout of the network (i.e., the network geometry as described below) the mobile station 108 may determine its position in a predefined reference coordinate system. As shown in FIG. 3, the mobile station may specify its position $(x_t, y_t)$ using a two-dimensional coordinate system; however, embodiments disclosed herein are not so limited, and may also be applicable to determining positions using a three-dimensional coordinate system, if the extra dimension is desired. Additionally, while three WAPS 311a-311c are shown in FIG. 3, embodiments may theoretically use only two WAPs when determining positions in two-dimensions. On the other hand, it may be desirable to utilize additional WAPs and solve for position using techniques applicable to over-determined systems, which can average out various errors introduced by different noise effects, and thus improve the accuracy of the determined position.

In order to determine position $(x_t, y_t)$ using wireless signal measurements, the mobile station 108 may first need to determine the network geometry. The network geometry can include the positions of each of the WAPS 311 in a reference coordinate system $((x_i, y_i)$, where i=1, 2, 3). The mobile station may then determine a distance $(d_i$, where i=1, 2, 3) to each of the WAPS 311. As will be described in more detail below, there are a number of different approaches for estimating these distances $(d_i)$ by exploiting different characteristics of the RF signals exchanged between the mobile station 108 and WAPs 311. Such characteristics may include, as will be discussed below, the round trip propagation time of the signals, and/or the strength of the signals (RSSI).

In other embodiments, the distances $(d_i)$ may in part be determined or refined using other sources of information that are not associated with the WAPs. For example, other positioning systems, such as SPS, may be used to provide a rough estimate of $d_i$. (Note that it is likely that SPS may have insufficient signal in the anticipated operating environments (indoors, metropolitan, etc.) to provide a consistently accurate estimate of $d_i$. However SPS signals may be combined with other information to assist in the position determination process.) Other relative positioning devices may reside in the mobile station 108 which can be used as a basis to provide rough estimates of relative position and/or direction (e.g., on-board accelerometers).

Once each distance is determined, the mobile station can then solve for its position $(x_t, y_t)$ by using a variety of known geometric techniques, such as, for example, trilateration. From FIG. 3, it can be seen that the position of the mobile station 108 ideally lies at the intersection of the circles drawn using dotted lines. Each circle being defined by radius $d_k$ and center $(x_k, y_k)$, where k=1, 2, 3. In practice, the intersection of these circles will not lie at a single point due to the noise and other errors in the networking system.

At time t=t+1, the mobile station may move to a new position $(x_{t+1}, y_{t+1})$ which may be offset from the original position $(x_t, y_t)$ by the vector $\vec{V}$. The relative motion sensor 212 may provide information to resolve the relative offset $\vec{V}$, and update the position of the mobile station 108. This position update may also be used to adjust the time delays associated with each of the WAPs 311 in order to improve the accuracy of the wireless-based position determination. In other embodiments, the magnitude of $\vec{V}$ may be threshold to determine if the mobile is stationary. In some embodiments, if the mobile is stationary, it may perform additional wireless-based measurements and average them together to improve the estimate of the WAP processing delays. In other embodiments, appropriate components within the mobile station 108 may enter a sleep state when it is not moving in order to conserve power.

Further referring to FIG. 3, determining the distance between the mobile station 108 and each WAP 311 may involve exploiting time information of the RF signals. Such techniques may involve determining the time delays introduced by various elements within the network in order to accurately determine position.

For example, one position determination technique may include determining the round trip time (RTT) of signals exchanged between the mobile station 108 and a WAP 311. RTT techniques can measure the time between sending a data packet and receiving an acknowledgement. This RTT may be accurately converted to a distance $(d_k)$ if processing delays in the WAP are known.

To measure the RTT with respect to a given WAP 311k, the mobile station 108 may send a directed probe request to the WAP 311k, and then record the time the probe request packet was sent ($t_{TX}$ Packet). After a propagation time $t_p$ from the mobile station 108 to the WAP 311k, the WAP will receive the packet. The WAP 311k may then process the directed probe request and may send an ACK back to the mobile station 108 after some processing delay $\Delta$. After a second propagation time $t_p$, the mobile station 108 may record the time the ACK packet was received ($t_{RX}$ ACK). The mobile station may then determine the RTT as the time difference $t_{RX}$ ACK$-t_{TX}$ Packet.

If the mobile station 108 knows the WAP 311k processing delay $\Delta$, it can then estimate the propagation time to the WAP 311k as (RTT-$\Delta$)/2, which will correspond to the distance $(d_k)$ between the mobile station 108 and the WAP 311k. However, since the mobile station 108 typically has no knowledge of the WAP 311k processing delay, the mobile station 108 should obtain an accurate estimate of the processing delay $\Delta$ before it can estimate the distance to the WAP 311k.

Improving Wireless-Based Positioning Using Relative Motion Sensor Information

Figure 4:
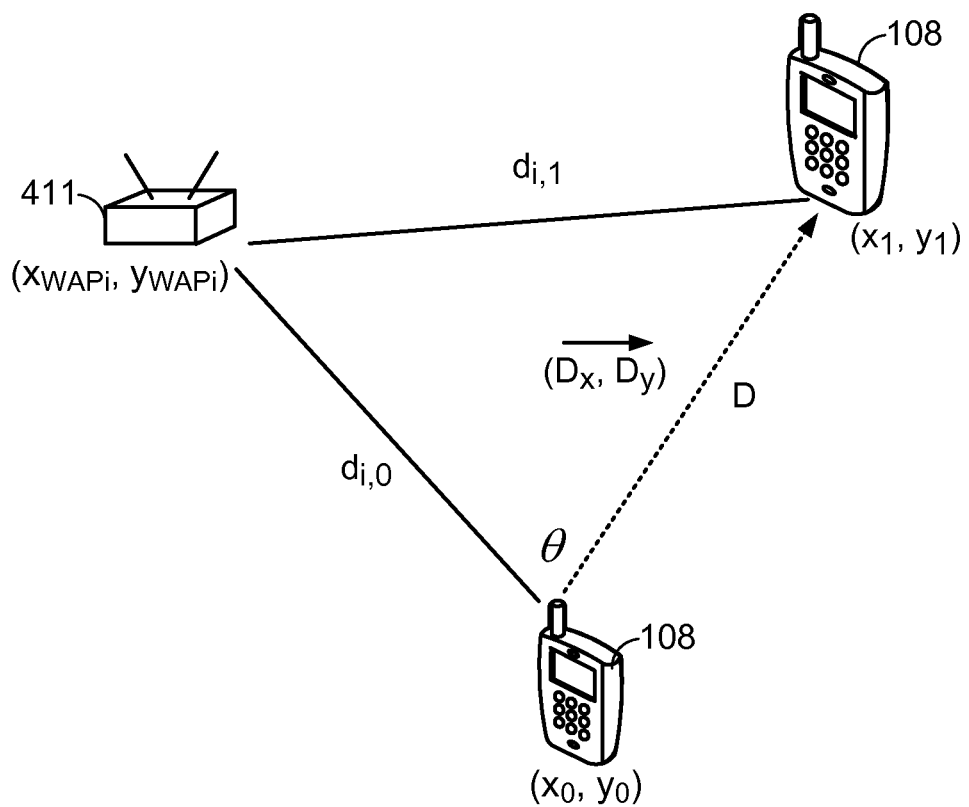
FIG. 4 is diagram illustrating an exemplary technique for refining a position of a mobile station using a relative motion sensor.

FIG. 4 is diagram illustrating an embodiment for utilizing information obtained from the relative motion sensor 212 to refine a position of a mobile station and/or adjust the processing delay for each WAP. Initially, the mobile station 108 may have determined its position $(x_0, y_0)$ using the wireless-based position measurements (RTT-based, RSSI-based and/or SPS-based) as described above. The WAP 411 may be at position $(x_{WAP-i}, y_{WAP-i})$, being a distance $d_o$ from mobile station 108. While only one WAP 411 is shown in FIG. 4 for simplicity, it should be understood that other WAPs are typically within wireless range. The position $(x_{WAP-i}, y_{WAP-i})$ of WAP 411 may be known by the mobile station 108 and can be expressed in a standard reference coordinate frame (e.g., WGS-84 used in GPS).

The mobile station 108 may move from position $(x_0, y_0)$ to position $(x_1, y_1)$. This movement may be detected by the relative motion sensor 212, which may then provide information so that a displacement D and an angle θ may be determined. For example, a single displacement value D may be determined by the appropriate integration of a single axis accelerometer. The angle may be determined using a single orientation sensor measuring an angle in the horizontal plane. The angle θ may be measured with respect to the original line of sight between WAP 411 and mobile station 108 (along $(d_{i,o})$).

If it is determined that the displacement is large enough to indicate actual motion of the mobile station, then a new distance $(d_{i,1})$ between the WAP 411 and the mobile station 108 may be calculated. If the displacement is relatively small, the mobile station may use a simpler method to determine position other than trilateration in order to save power. For example, a simple trigonometric formula such as the law of cosines may be used. The new distance $(d_{i,1})$ between the WAP 411 and the mobile station's new position $(x_1, y_1)$ may be computed using the old displacement $(d_{i,o})$, the angle θ, and the displacement D. Once the new distance $d_{i,1}$ is found, the processing delay $(\Delta_i)$ associated with WAP 411 may be determined as follows in Eqn. 3.

$$\Delta_{i,1} = RTT_{i,1} - 2d_{i,1}$$

where:

$RTT_{i,1}$ is a new round trip time associated with WAP 411 at the new position $(x_1, y_1)$.

As the mobile station 108 moves about, multiple estimates of the processing delay may be combined for each WAP to reduce noise. For example, multiple measurements may be combined using an exponential low pass filter.

In another embodiment, the relative motion sensor 212 may instead provide the displacement components $(D_x, D_y)$ to describe the relative displacement of the mobile station 108. These displacement components may be in a body-fixed reference associated with the mobile station 108. The body-fixed components may be converted to a standard reference frame if the orientation of the body fixed frame is known with respect to a known reference. In one embodiment, the relative motion sensor 212 may further include an orientation sensor which can provide planar angular information with respect to a known reference (e.g., a geo-magnetic sensor providing an angle with respect to north). By combining the angle and the relative displacement components, along with the old position $(x_0, y_0)$ of the mobile station 108, a vector describing the new position of the mobile station 108 may be determined in the standard reference frame. This vector may then easily be used to compute new displacement $(d_{i,1})$ between the WAP 411 and the mobile station 108.

While FIG. 4 shows the position information being described in a two-dimensional reference frame, it should be appreciative that the position determination may be performed in three-dimensional space. In such a case, the relative motion sensor may be a three-axis accelerometer that provides three components of displacement (Dx, Dy, Dz) in a body-fixed reference frame, and the orientation sensor provide two reference angles (e.g., the angle with respect to north and the angle with respect to nadir). In addition, an altimeter may be used to assist in the three-dimensional position determination. For example, z-axis information may be determined using a barometric pressure sensor, which may provide height in a quantized using the barometric pressure sensor, the error in the z-dimension can be made with +/−5 feet for a typical office building.

Other Uses for Relative Motion Sensor Information

As described above, thresholding operations may be performed on the displacement distance $d_{i,1}$ to determine if the mobile station is moving. For example, if $d_{i,1}$ is below a certain value, it may be safely assumed that the mobile station is not moving. In this case, additional wireless measurements could be made, and combined to reduce noise. Such combination may include any type of known averaging, filtering, and/or other processing techniques to reduce noise/improve signal. Such techniques could be used to better estimate position, and/or improve the estimate of the processing delay for each WAP 311.

In another embodiment, the mobile station could be placed in a power saving mode wherein the rate at which the mobile device attempts to obtain a position fix may be reduced. This power saving mode may be entered upon detecting that the mobile station has not moved over a certain period of time, and thus reduce the position update frequency in order to save battery power. The frequency of the position update may be reduced to zero.

Figure 5:
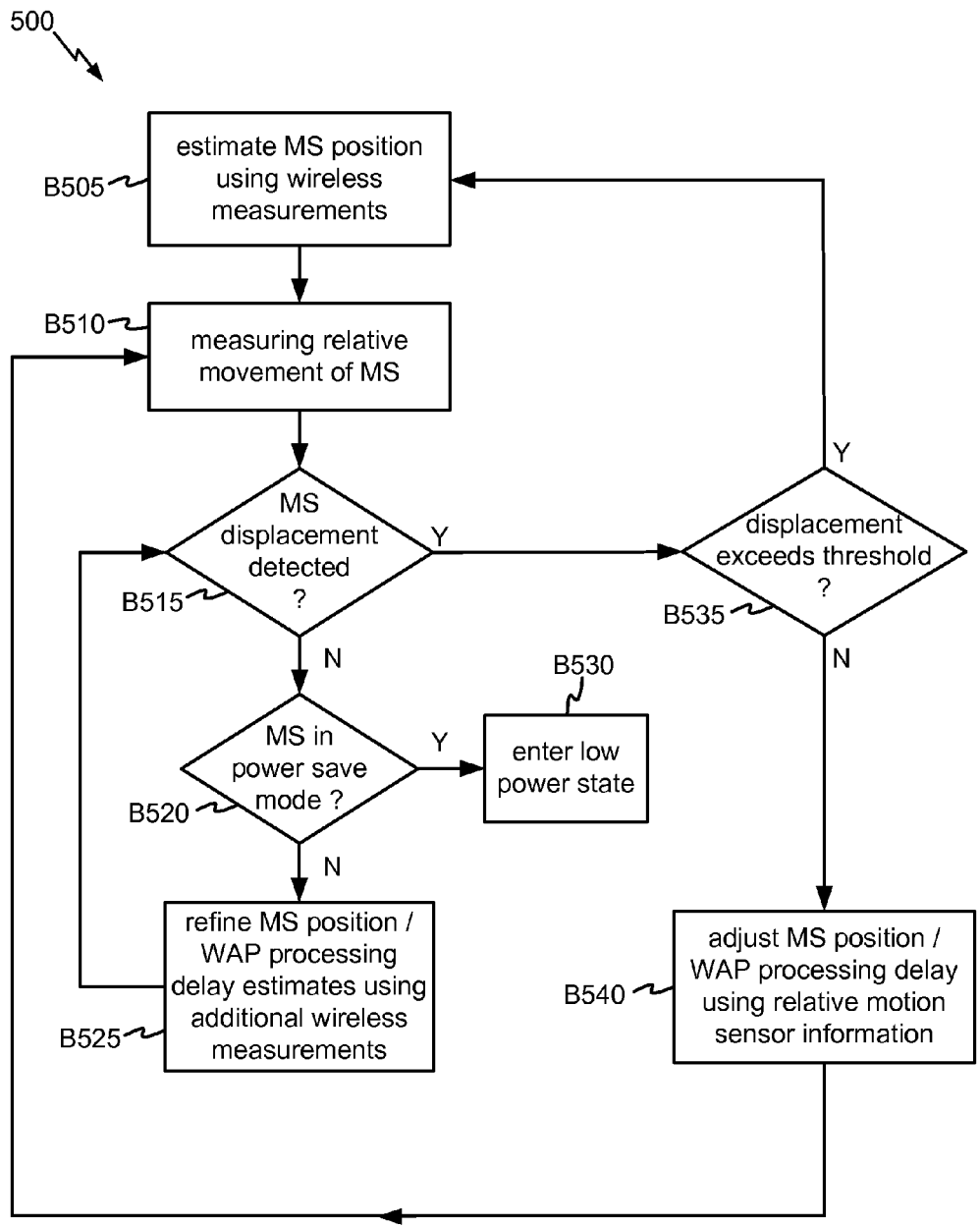
FIG. 5 is a flowchart including an exemplary process for adjusting the position a mobile station obtained from wireless measurements using a relative motion sensor.

FIG. 5 is a flowchart including an exemplary process 500 for adjusting the position of the mobile station 108 obtained from wireless measurements using a relative motion sensor 212. Moreover, the embodiment illustrates further methods for power saving and position averaging as described above. The process 500 may be performed at the mobile station 108 by processor 210, operating in conjunction with the relative motion sensor 212, the wide area network transceiver 204, the local area network transceiver 206 and/or the SPS receiver 208.

The process 500 may initially start out by determining the position of the mobile station (MS) 108 using wireless measurements (B505). As mentioned above, the wireless measurements may be RTT-based. In other embodiments, the wireless measurements may be provided by or in conjunction with the SPS receiver 208. Next, the process 500 may measure the relative movement of the mobile station 108 using information provided by the relative motion sensor 212 (B510). A thresholding operation may be performed to determine if the mobile station 108 was moving (i.e., actually displaced) (B515). If the MS 108 was in motion, another determination may be performed to test if the relative displacement exceeds a threshold (B535). If the relative displacement is large, the mobile station will loop back to B505 and determine the new MS position using new wireless measurements. The reason for this is because the large displacement may have caused a change in the relative signal strengths of one or more WAPs 311. Alternatively, if it was determined that the relative displacement was below a threshold in B535, the position of the MS 108 may be adjusted using information provided by the relative motion sensor. Additionally, the processing delay for each WAP 311 may be adjusted by determining the new distances to each WAP (based on the information provided by the relative motion sensor 212), and by performing new wireless position determination measurements to each associated WAP (B540). The process 500 may the loop back to B510 where the relative movement of the MS 108 is monitored by the motion sensor 212.

If it is determined in B515 that no substantial displacement was detected (i.e., the mobile station 108 was stationary), the mobile station may enter a low power state (B530) if it was determined to be set in a power saving mode (B520). If the mobile station is not in a power saving mode as determined in B520, the mobile station may refine its position and/or WAP processing delay estimates by averaging additional wireless-based positioning measurements (B525). Because the mobile station is stationary, each new independent position should be highly correlated, and averaging these values may significantly reduce noise and improved the processing delay estimates. Once B525 is completed, the process 500 may loop back to B510 in order for the relative motion sensor to further monitor the mobile station 108 movements.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Accordingly, an embodiment of the invention can include a computer readable media embodying a method for adjusting wireless-based positions using relative motion sensors. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for adjusting a wireless-based position estimate of a mobile station using a relative motion sensor, comprising:
   estimating a position of a mobile station based upon wireless signal measurements;
   measuring a movement of the mobile station using the relative motion sensor;
   detecting a displacement of the mobile station based upon the measured movement;
   determining that the displacement is below a threshold; and
   adjusting the estimated position of the mobile station using information from the relative motion sensor.

2. The method of claim 1, further comprising:
   determining that the displacement is above a threshold; and
   updating the position of the mobile station using additional wireless measurements.
3. The method of claim 1, further comprising:
   detecting substantially no displacement based upon the movement data;
   determining that the mobile station in a power saving mode; and
   entering a reduced power consumption state.
4. The method of claim 1, wherein the estimating a position of a mobile station further comprises:
   determining the mobile station position based upon Satellite Positioning System (SPS) signal measurements.
5. The method of claim 1, wherein the measuring a movement of the mobile station further comprises:
   measuring an acceleration of the mobile station;
   integrating the acceleration to determine a distance;
   determining an orientation angle corresponding to the movement of the mobile station; and
   combining the acceleration and orientation angle to determine a vector describing the displacement of the mobile station.
6. The method of claim 5, wherein the detecting a displacement of the mobile station further comprises:
   thresholding the distance to classify the state of the mobile station as being stationary or moving.
7. The method of claim 1, further comprising:
   detecting substantially no displacement based upon the movement data;
   determining an updated position of the mobile station based upon additional wireless signal measurements; and
   combining the estimated and updated positions of the mobile station to produce an improved position estimate.
8. The method of claim 7, wherein the combining the estimated and updated positions of the mobile station further comprises:
   filtering multiple measurements of position derived using the wireless signal measurements to refine a processing delay associated with each wireless access point.
9. The method of claim 7, wherein the mobile station and the wireless access points operate in accordance with IEEE 802.11 standards.
10. The method of claim 1, wherein the estimating a position of a mobile station further comprises:
    determining a distance to each of a plurality of wireless access points based upon a propagation delay and a processing delay associated with each wireless access point; and
    calculating the position of the mobile station using the distance to each wireless access point.
11. The method of claim 10, wherein the adjusting the estimated position of the mobile station further comprises:
    deriving a displacement vector using the information from the relative motion sensor; and
    refining the processing delay associated with each wireless access point using the derived displacement vector.
12. The method of claim 10, wherein the adjusting the estimated position of the mobile station further comprises:
    deriving a displacement vector using the information from the relative motion sensor; and
    combining the estimated position of the mobile station with the displacement vector to determine a new position.
13. An apparatus for adjusting a wireless-based position estimate of a mobile station using a relative motion sensor, comprising:
    a wireless transceiver;
    a relative motion sensor;
    a processor coupled to the wireless transceiver and the relative motion sensor; and
    a memory coupled to the processor, wherein the memory stores executable instructions and data for causing the processor to:
        estimate a position of the mobile station based upon measurements of wireless signals received by the wireless transceiver,
        determine that the mobile station is moving based upon information provided by the relative motion sensor,
        calculate a displacement of the mobile station based upon the information provided by the relative motion sensor,
        determine that the displacement is below a threshold, and
        adjust the estimated position of the mobile station using the information from the relative motion sensor.
14. The apparatus of claim 13, wherein the memory includes instructions further causing the processor to:
    determine that the displacement is above a threshold, and
    update the position of the mobile station using additional wireless measurements.
15. The apparatus of claim 13, wherein the memory includes instructions further causing the processor to:
    detect substantially no displacement based upon the movement data,
    determine that the mobile station in a power saving mode, and
    enter a reduced power consumption state.
16. The apparatus of claim 13, wherein the memory includes instructions further causing the processor to
    detect substantially no displacement based upon the movement data,
    determine an updated position of the mobile station based upon additional wireless signal measurements, and
    combining the estimated and updated positions of the mobile station to provide an improved position estimate.
17. The apparatus of claim 13, wherein the memory includes instructions further causing the processor to:
    determine a distance to each of a plurality of wireless access points based upon a propagation delay and a processing delay associated with each wireless access point; and
    calculate the position of the mobile station using the distance to each wireless access point.
18. The apparatus of claim 13, wherein the relative motion sensor comprises an accelerometer and/or an orientation sensor.
19. The apparatus of claim 13, wherein the wireless transceiver comprises a wide area network transceiver and/or a local area network transceiver.
20. The apparatus of claim 19, wherein the wide area network transceiver operates in accordance with WiMax (IEEE 801.16) and/or digital cellular networking standards.
21. The apparatus of claim 19, wherein the local area network transceiver operates in accordance with WiFi (802.11x), cellular piconet, cellular femtocell, and/or Bluetooth networking standards.
22. The apparatus of claim 19, further comprising: a Satellite Positioning System (SPS) receiver which receives wireless signals for performing position determination of the mobile station.

23. A non-transitory machine-readable medium comprising instructions, which, when executed by a machine, cause the machine to perform operations, the instructions comprising:
   instructions to estimate a position of a mobile station based upon wireless signal measurements;
   instructions to measure a movement of the mobile station using a relative motion sensor;
   instructions to detect a displacement of the mobile station based upon the measured movement;
   instructions to determine that the displacement is below a threshold; and instructions to adjust the estimated position of the mobile station using information from the relative motion sensor.

24. The machine-readable medium of claim 23, further comprising:
   instructions to determine that the displacement is above a threshold; and
   instructions to update the position of the mobile station using additional wireless measurements.

25. The machine-readable medium of claim 23, further comprising:
   instructions to detect substantially no displacement based upon the movement data;
   instructions to determine that the mobile station in a power saving mode; and
   instructions to enter a reduced power consumption state.

26. The machine-readable medium of claim 23, wherein the instructions to estimate a position of a mobile station further comprise:
   instructions to determine the mobile station position based upon Satellite Positioning System (SPS) signal measurements.

27. The machine-readable medium of claim 23, wherein the instructions to measure a movement of the mobile station further comprise:
   instructions to measure an acceleration of the mobile station;
   instructions to integrate the acceleration to determine a distance;
   instructions to determine an orientation angle corresponding to the movement of the mobile station; and
   instructions to combine the acceleration and orientation angle to determine a vector describing the displacement of the mobile station.

28. The machine-readable medium of claim 27, wherein the instructions to detect a displacement of the mobile station further comprise:
   instructions to threshold the distance to classify the state of the mobile station as being stationary or moving.

29. The machine-readable medium of claim 23, further comprising:
   instructions to detect substantially no displacement based upon the movement data;
   instructions to determine an updated position of a mobile station based upon additional wireless signal measurements; and
   instructions to combine the estimated and updated positions of the mobile station to provide an improved position estimate.

30. The machine-readable medium of claim 29, wherein the instructions to combine the estimated and updated positions of the mobile station further comprise:
   instructions to filter multiple measurements of position derived using the wireless signal measurements to refine a processing delay associated with each wireless access point.

31. The machine-readable medium of claim 23, wherein the instructions to estimate a position of a mobile station further comprise:
   instructions to determine a distance to each of a plurality of wireless access points based upon a propagation delay and a processing delay associated with each wireless access point; and
   instructions to calculate the position of the mobile station using the distance to each wireless access point.

32. The machine-readable medium of claim 31, wherein the instructions to adjust the estimated position of the mobile station further comprise:
   instructions to derive a displacement vector using the information from the relative motion sensor; and
   instructions to refine the processing delay associated with each wireless access point using the derived displacement vector.

33. The machine-readable medium of claim 31, wherein the instructions to adjust the estimated position of the mobile station further comprise:
   instructions to derive a displacement vector using the information from the relative motion sensor; and
   instructions to combine the estimated position of the mobile station with the displacement vector to determine a new position.

34. An apparatus for adjusting a wireless-based position estimate of a mobile station using a relative motion sensor, comprising:
   means for estimating a position of a mobile station based upon wireless signal measurements;
   means for measuring a movement of the mobile station using the relative motion sensor;
   means for detecting a displacement of the mobile station based upon the measured movement;
   means for determining that the displacement is below a threshold; and
   means for adjusting the estimated position of the mobile station using information from the relative motion sensor.

35. The apparatus of claim 34, further comprising:
   means for determining that the displacement is above a threshold; and
   means for updating the position of the mobile station using additional wireless measurements.

36. The apparatus of claim 34, further comprising:
   means for detecting substantially no displacement based upon the movement data;
   means for determining that the mobile station in a power saving mode; and
   means for entering a reduced power consumption state.

37. The apparatus of claim 34, wherein the means for estimating a position of a mobile station further comprises:
   means for determining the mobile station position based upon Satellite Positioning System (SPS) signal measurements.

38. The apparatus of claim 34, wherein the means for measuring a movement of the mobile station further comprises:
   means for measuring an acceleration of the mobile station;
   means for integrating the acceleration to determine a distance;
   means for determining an orientation angle corresponding to the movement of the mobile station; and
   means for combining the acceleration and orientation angle to determine a vector describing the displacement of the mobile station.

39. The apparatus of claim 38, wherein the means for detecting a displacement of the mobile station further comprises:
  means for thresholding the distance to classify the state of the mobile station as being stationary or moving.

40. The apparatus of claim 34, further comprising:
  means for detecting substantially no displacement based upon the movement data;
  means for determining an updated position of a mobile station based upon additional wireless signal measurements; and
  means for combining the estimated and updated positions of the mobile station to improve the accuracy thereof.

41. The apparatus of claim 40, wherein the means for combining the estimated and updated positions of the mobile station further comprises:
  means for filtering multiple measurements of position derived using the wireless signal measurements to refine a processing delay associated with each wireless access point.

42. The apparatus of claim 34, wherein the means for estimating a position of a mobile station further comprises:
  means for determining a distance to each of a plurality of wireless access points based upon a propagation delay and a processing delay associated with each wireless access point; and
  means for calculating the position of the mobile station using the distance to each wireless access point.

43. The apparatus of claim 42, wherein the means for adjusting the estimated position of the mobile station further comprises:
  means for deriving a displacement vector using the information from the relative motion sensor; and
  means for refining the processing delay associated with each wireless access point using the derived displacement vector.

44. The apparatus of claim 42, wherein the means for adjusting the estimated position of the mobile station further comprises:
  means for deriving a displacement vector using the information from the relative motion sensor; and
  means for combining the estimated position of the mobile station with the displacement vector to determine a new position.

* * * * *